United States Patent [19]

Reismüller

[11] 4,072,047
[45] Feb. 7, 1978

[54] METHOD AND APPARATUS FOR MONITORING INTAKE MANIFOLD VACUUM

[75] Inventor: Anton Reismüller, Goppingen, Germany

[73] Assignee: Remesta GmbH, Heiningen, Germany

[21] Appl. No.: 742,129

[22] Filed: Nov. 15, 1976

[30] Foreign Application Priority Data

Nov. 15, 1975 Germany .............................. 2551359

[51] Int. Cl.² .............................................. G01L 23/24
[52] U.S. Cl. ...................................................... 73/115
[58] Field of Search ...................... 73/115, 398 R, 116; 340/60

[56] References Cited

U.S. PATENT DOCUMENTS

| 3,894,435 | 7/1975 | Shimada et al. | 73/115 X |
| 3,922,909 | 12/1975 | Dixson et al. | 73/115 |
| 3,937,202 | 2/1976 | Heath | 73/115 X |

Primary Examiner—Jerry W. Myracle
Attorney, Agent, or Firm—Herbert E. Kidder

[57] ABSTRACT

A method and apparatus for continuously monitoring and telemetering the condition of the vacuum pressure in the intake manifold of an automotive vehicle. The vacuum pressure is continuously sampled by a vacuum-pressure-sensitive device having one end that moves responsive to changes in the vacuum pressure. Mounted on the movable end of the device is a scanning arrangement that moves a pair of metal strips across the front of two light barrier devices as the pressure changes. In the preferred form, the two light barrier devices each consist of a photo-diode transmitter and a photo-transistor receiver. The output from the light barrier devices consists of an electrical signal having three stages as the pressure increases or decreases. The electrical signal passes through a switching arrangement which successively lights up three different-colored lights to inform the operator as to the condition of the vacuum in the intake manifold.

7 Claims, 4 Drawing Figures

METHOD AND APPARATUS FOR MONITORING INTAKE MANIFOLD VACUUM

BACKGROUND OF THE INVENTION

The present invention pertains to a method and apparatus for continuously monitoring and telemetering the momentary engine-side operating condition of a motor vehicle with respect to the vacuum created in the intake manifold of the engine, as output and reference quantities.

In addition to the general conventional vacuum-indicating devices of a variety of systems and for a variety of applications — as described, for example, in German Pat. No. 82,836 — there have been offered on the market so-called vacuum meters as dashboard accessory equipment for sport motor vehicles, based on the long-established finding that an engine runs at its optimum rpm or performance range whenever the vacuum in the intake manifold of the engine is highest.

All of these known devices, however, have not become popular with the majority of motor vehicle operators because, on the one hand, it is difficult to accommodate them on the dashboard and, on the other hand, they would have made some sense only if observation of the continually swinging needles would not distract the driver from the road traffic so much. Another disadvantage is that, for one thing, in all known devices the complicated transmission mechanisms from the vacuum box or spring to the pendulum needle causes considerable inaccuracy of the measured values and, for another, the vacuum indication, as such, gives clear information so as to initiate action only to the technically-well-versed operator, but not the average driver.

SUMMARY OF THE INVENTION

The present invention therefore has as its primary object to provide a method and apparatus which, on the basis of the respective intake manifold vacuum as output quantity, carries out a continuous control of the motor vehicle's operating state, and conveys this to the driver, at least within certain ranges, as information in simple symbolism or acoustics, without distracting his attention from the road traffic.

This problem is solved by a preferably mechanical-electronic sampling of the vacuum prevailing in the intake manifold of the engine, feeding this reference quantity to an electronic evaluating or switching station, and transforming the measured quantity into optical or acoustic signals for the driver, with possibly simultaneous initiation of additional functions in the vehicle system.

Further details of the invention, its mode of operation and the special advantages of the preferred embodiment thereof will become apparent from the following detailed description, with reference to the accompanying drawings.

DESCRIPTION OF THE PREFERRED EMBODIMENT

Figure 1:
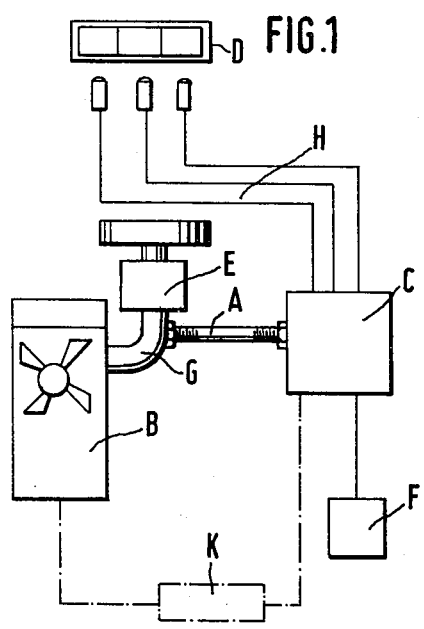
FIG. 1 is a block diagram showing the system according to the invention.

The block diagram of the system of the invention in FIG. 1 shows schematically the tap A of an intake manifold G between the engine B and carburetor E; feeding of the measured quantity to a mechanical-electronic measuring and evaluating station C, which is connected on the voltage side with the power supply F of the particular motor vehicle; and telemetering via the cable system H to a control display or indicator D, as either optical or acoustical signaling in the area of the dashboard and in the driver's main line of sight.

Furthermore, the electronic evaluating station C may be operatively connected to other units K, indicated in dash-dot lines, whereby the units K can be correctly timed to connect in with the engine B, as required.

The method of the contactless sampling of the engine vacuum has the great advantage that the measured values get into the electronic evaluator unfalsified and thus in addition to the display of the instantaneous operative state, there can also take place the connecting in of any further units K at the respective required moment; as an example of this there may be mentioned the connecting in of a so-called turbo-charger for accelerating the vehicle, or the automatic control of a gearing system.

Figure 2:
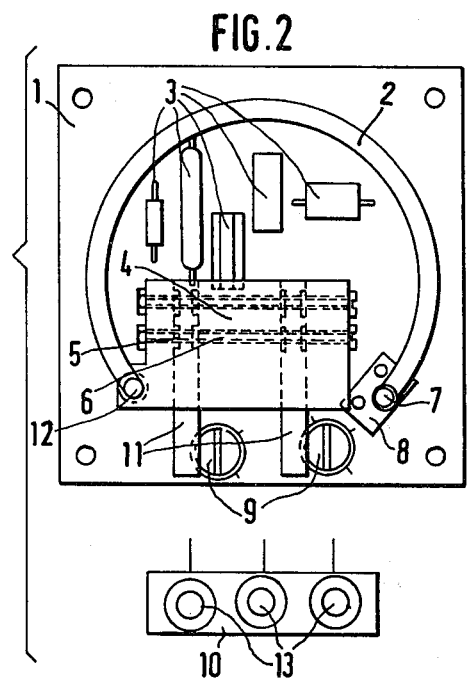
FIG. 2 is a front elevational view of the device of the invention.
Figure 3:
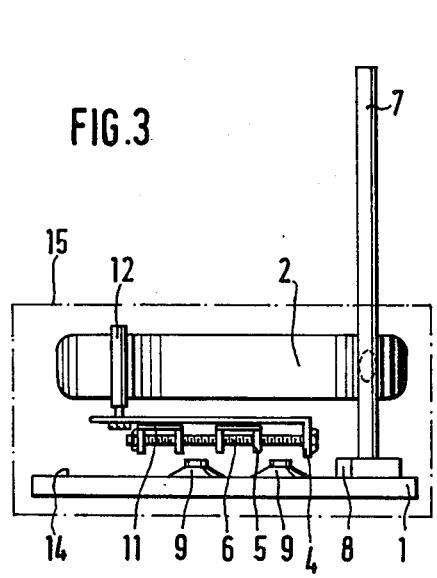
FIG. 3 is a top view of the device in FIG. 2.

FIGS. 2 and 3 illustrate one embodiment of the mechanical construction of the device, according to the invention, for the practice of the method.

On plate 1, through a foot piece 8, a vacuum tube 7 is fastened, to which in turn is connected the fixed end of a bourdon tube 2, the free end of which is moved by the respective vacuum conditions. At the free end 12 of the bourdon tube 2, which may analogously be designed also as pressure gauge or spring bellows, there is articulated movably, i.e., adjustable, a setting mechanism 4 carrying reflector metal strips 11 movable via nuts and spindles 5, 6 or the like, as measured value transmitter. With this setting mechanism 4, 5, 6 it is now possible exactly to adjust, independently of each other, the range within which the transmitter-receiver parts 9, 11, designed as reflector light barriers 9, send out optical or acoustical signals. Mounted on plate 1 are the usual electronic components 3 which are connected into the circuit, the said components being conventional and therefore not explained in detail, and the interconnection thereof, not shown, preferably on the free back 14 of the plate.

Connected with the evaluating system 3 to 11 via cables not shown there serve as signal transmitters luminous diodes 13 in different colors in the area of the dashboard 10; or acoustic signal transmitters located at the same or a similar place. A splashproof housing 15, preferably common to both, protects the elements 1 to 12 (excepting 10) and 14, appropriately so that they may be mounted within the engine compartment.

Figure 4:
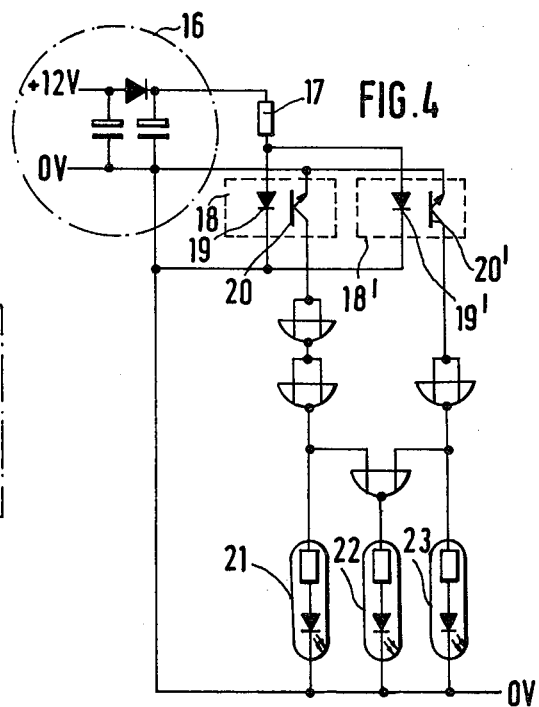
FIG. 4 is a schematic electrical circuit diagram of the system.

A possible circuit of the electronic part is shown in FIG. 4. The voltage taken from the power supply is first filtered via the electronic component group 16 shown in a dash-dot circle, so that voltage peaks as well as voltage collapses are smoothed out.

Then one goes via the resistor 17 to the two reflector light barriers 18, 18', each consisting of a photo-diode 19, 19' as transmitter and a photo-transistor 20, 20' as receiver, but which are combined as a unit in a common housing 9.

Now the mode of operation and indication is as follows: In the presence of the full vacuum from the running of the engine, both light barriers are covered by the movement of the free end of bourdon tube 2 and position of the parts 11. This in turn has the result that the two photo-transistors 20, 20' are conductive, i.e., are on 0 volt, owing to which only the light-emitting diode 23 (e.g., green) burns. Now if the vacuum in the engine decreases, as when depressing the accelerator, one of the two reflector light barriers 18' or 19', 20' becomes free and the diode 22 (e.g.yellow) lights up. If the vacuum decreases still further, the second light barrier 18 also becomes free; the light:emitting diode 23 stays off; the yellow 22 extinguishes; and diode 21, e.g.red, lights up.

These operative states can be represented in a similar manner acoustically as different sound symbols or sound sequences.

What I claim is:

1. A method for continuously monitoring and telemetering the momentary operating condition of a motor vehicle engine with respect to the vacuum created in the intake manifold of the engine as output and reference quantity, comprising the steps of:
   1. continuously sampling the vacuum in the intake manifold of the engine;
   2. utilizing changes in the vacuum pressure to produce an electrical signal having a plurality of stages representing different successive levels of vacuum pressure;
   3. feeding this electrical signal to an electronic switching station linked with the electrical power supply of the vehicle; and
   4. utilizing electricity from said electrical power supply as directed by said electronic switching station to actuate a signal that can be sensed by the operator, said signal informing the operator as to the state of the vacuum in the intake manifold at that particular instant.

2. A method as in claim 1, in which the signal actuated by the electrical power supply and the electronic switching station comprises an optical signal.

3. A method as in claim 2, in which the optical signal consists of a plurality of different-colored lights that are lighted up successively as the vacuum pressure changes.

4. A method as in claim 1, in which the signal actuated by the electrical power supply and the electronic switching station comprises an acoustical signal.

5. A method as in claim 1, in which the signal actuated by the electrical power supply and the electronic switching station is utilized to actuate an associated mechanical device according to the need of the engine, as called for by the vacuum pressure in the intake manifold at a given instant.

6. Apparatus for continuously monitoring and telemetering the momentary operating condition of a motor vehicle/engine with respect to the vacuum pressure created in the intake manifold of the engine, comprising:
   a vacuum-pressure-sensitive device connected to the intake manifold of the engine, said device having a movable end that moves responsive to changes in the vacuum pressure;
   an electronic scanning system connected to said movable end of said device, said scanning system being operable to produce an electrical signal having a plurality of stages representing different successive levels of vacuum pressure;
   an electronic switching circuit linked to the electrical power source of the vehicle, said switching circuit being operable to direct electrical current to one or another of a plurality of signalling devices responsive to a corresponding stage of said electrical signal, thereby actuating a signal that informs the operator as to the condition of the vacuum pressure in the intake manifold.

7. Apparatus as in claim 6, wherein said signalling devices comprise a plurality of different-colored lights that are successively lighted up as the pressure changes.

* * * * *